United States Patent
Bartolotta et al.

(10) Patent No.: US 9,466,165 B2
(45) Date of Patent: *Oct. 11, 2016

(54) EQUIPMENT SYSTEM CHECKING APPARATUS AND METHOD

(71) Applicant: SafeTstart, LLC, Anchorage, AK (US)

(72) Inventors: Vito Ignatius Bartolotta, Sisters, OR (US); Justin Green, Anchorage, AK (US)

(73) Assignee: Safe T Start, LLC, Anchorage, AK (US)

(*) Notice: Subject to any disclaimer, the term of this patent is extended or adjusted under 35 U.S.C. 154(b) by 0 days.

This patent is subject to a terminal disclaimer.

(21) Appl. No.: 14/880,239

(22) Filed: Oct. 11, 2015

(65) Prior Publication Data

US 2016/0071347 A1    Mar. 10, 2016

Related U.S. Application Data

(63) Continuation of application No. 14/467,621, filed on Aug. 25, 2014, now Pat. No. 9,159,172.

(60) Provisional application No. 61/871,159, filed on Aug. 28, 2013.

(51) Int. Cl.
| | |
|---|---|
| G07C 9/00 | (2006.01) |
| G07C 5/00 | (2006.01) |
| G07C 5/08 | (2006.01) |
| B60R 16/023 | (2006.01) |

(52) U.S. Cl.
CPC ....... *G07C 9/00896* (2013.01); *B60R 16/0234* (2013.01); *G07C 5/00* (2013.01); *G07C 5/08* (2013.01); *G07C 9/00182* (2013.01); *G07C 2009/00984* (2013.01)

(58) Field of Classification Search
CPC ...... G07C 5/00; G07C 5/08; G07C 9/00182; G07C 9/00896; G07C 2009/00984; B60R 16/0234
See application file for complete search history.

(56) References Cited

U.S. PATENT DOCUMENTS

2010/0253535 A1*  10/2010  Thomas ................. H04B 1/082
                                                                340/4.37

* cited by examiner

*Primary Examiner* — Yuen Wong
(74) *Attorney, Agent, or Firm* — Hancock Hughey LLP

(57) ABSTRACT

An apparatus and system that ensures that defined equipment systems are monitored and checked before the equipment may be used is described. The invention includes apparatus that encourages the equipment operator to perform specified monitoring checks on specified systems at specified intervals, and requires that the check is done by the operator physically removing a check device such as a crankcase or transmission dipstick, radiator cap, air filter, and so on. Failure to perform the required monitoring task results in the equipment being disabled or locked out so that the operator is unable to use the equipment; for example, a starter motor may be locked out so that the engine cannot start until a specified monitoring check has been completed.

18 Claims, 6 Drawing Sheets

EQUIPMENT SYSTEM CHECKING APPARATUS AND METHOD

TECHNICAL FIELD

The present invention relates to systems for maintaining equipment such as vehicles, and more particularly, to apparatus for insuring that specific operating systems of the equipment are in proper condition for use prior to start-up or other use.

BACKGROUND

Vehicles and equipment such as heavy machinery have a variety of systems that require ongoing maintenance and monitoring. For example, the engines used in most heavy equipment, typically diesel engines, include lubricant-filled crankcases and transmissions, coolant-filled radiators, and a variety of other systems that must be monitored to insure that the systems are in proper working condition. Failure to maintain such equipment can lead to very expensive repairs, and equipment obviously is not useful during the time when it is in the shop being repaired. As such, routine monitoring of critical systems and maintenance of the systems when repairs are required is an important component of a well-run operation.

As an example, one simple preventative technique that can help to avoid a common source of engine damage is to check the engine oil level on a regular basis, preferably daily when the engine is being operated, to make sure that there is the correct amount oil in the engine. Most engine manufacturers and most equipment manufacturers, sellers and companies that rent equipment ask operators to check the engine oil daily, before the engine is started. Often, a sticker or placard is placed near the ignition switch reminding the operator to check the engine oil level. The same applies to other lubricant-containing systems such as transmissions and hydraulic systems, coolant systems such as radiators, and other critical operating components such as air filters.

Even though policy may dictate that equipment operators always check specific systems on a routine basis, the unfortunate reality is that operators do not always check things like engine oil levels, transmission fluid levels, coolant levels, air filters and the like as frequently as might be needed. As a result, engine damage can sometimes result when there is insufficient oil in the engine or transmission, or the coolant levels are low, or an air filter is clogged. These are just a few of the types of critical systems that require frequent monitoring to insure that equipment is properly maintained.

Frequent inspection of equipment operating systems is an important part of a preventative maintenance program and there are a variety of systems that need inspection and monitoring, from engine and transmission lubricant levels to radiator coolant levels and air filters. Because operator complacency can be a problem when it comes to making routine maintenance checks of these systems, there is a pronounced need for methods and apparatus that force the operator to check specified systems to insure that they are in proper operating condition.

The present invention relates to an apparatus and system that ensures that defined equipment systems are monitored and checked before the equipment may be used. The invention includes apparatus that encourages the equipment operator to perform monitoring checks on specified systems at specified intervals, and requires that the check is done by the operator physically removing a check device such as a crankcase or transmission dipstick, radiator cap, air filter, and so on. Failure to perform the required monitoring task results in the equipment being disabled or locked out so that the operator is unable to use the equipment; for example, a starter motor may be locked out so that the engine cannot start until a specified monitoring check has been completed.

BRIEF DESCRIPTION OF THE DRAWINGS

The invention will be better understood and its numerous objects and advantages will be apparent by reference to the following detailed description of the invention when taken in conjunction with the following drawings.

DETAILED DESCRIPTION OF ILLUSTRATED EMBODIMENTS

Figure 1:
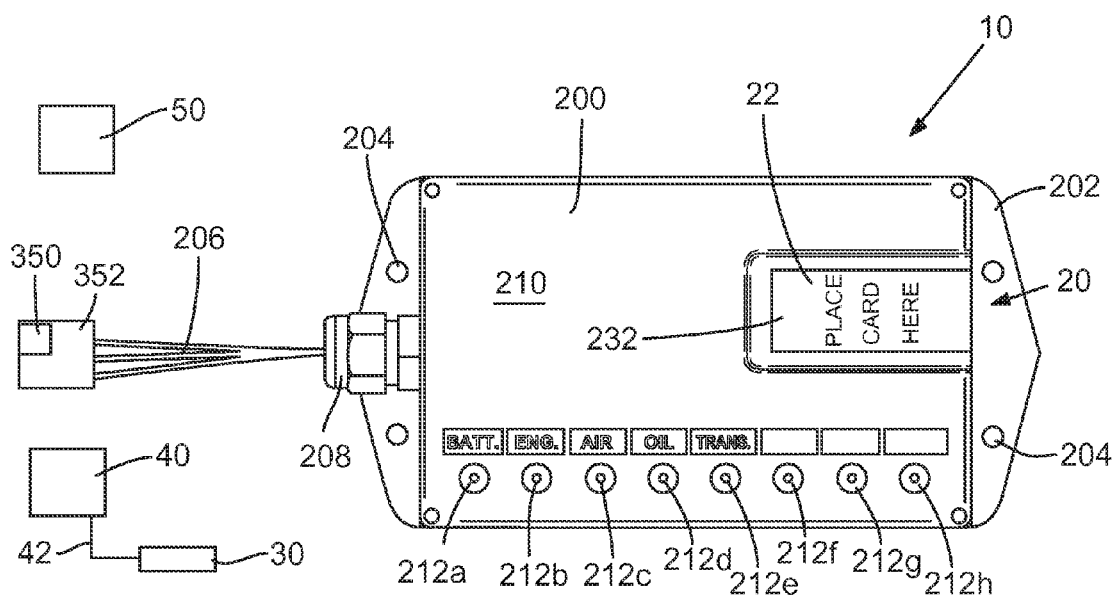
FIG. 1 is a top plan view and partially schematic of a first illustrated embodiment of an equipment monitoring system according to the present invention, illustrating the master module from the top side.
Figure 2:
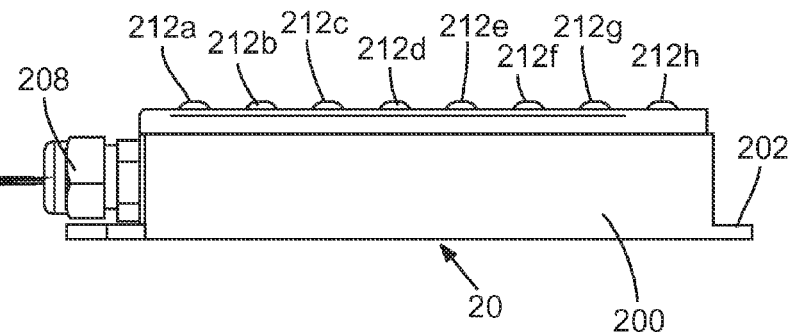
FIG. 2 is a side view of the master module illustrated in FIG. 1.
Figure 3:
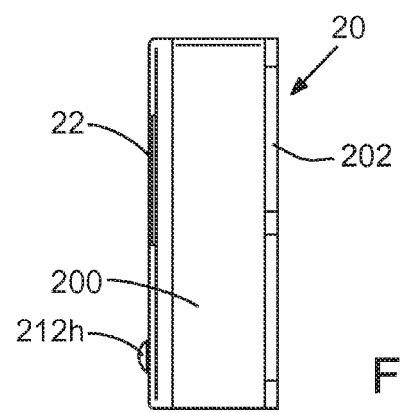
FIG. 3 is an end view of the master module illustrated in FIG. 1.

The invention will now be described with respect to the various embodiments that are illustrated in the drawings. Several embodiments are illustrated and like or analogous components in the various drawings are assigned the same reference numbers for the purpose of clarity.

The invention generally comprises a monitoring system that is defined by a master module that is mounted in one location, for instance, in the cab of a vehicle, and a RFID-equipped FOB that is attached to a system component of the vehicle, for instance, a crankcase dipstick. The master module is electrically interfaced with the vehicle's electrical system and is programmed as desired, but as an example, the master module may be programmed so that the engine's starter motor is locked or disabled unless and until the FOB that is attached to the dipstick is read by the master module. Once the FOB has been moved into close proximity to the master module so that its identifying data is read, the master module may unlock—that is, enable—the starter motor so that the engine may be started. As a practical matter, since the FOB and the dipstick are physically located such that they are remote from one another, in order to start the engine the operator is required to withdraw the dipstick, move the dipstick and FOB into the cab and have the FOB read by the master module before the engine may be started.

In one preferred embodiment, the invention comprises an engine ignition lockout module or "interlock" that is controlled by a master module that is mounted to a vehicle in a location that is remotely located from the system component or components of the engine that are required to be checked. As used herein, a "system component" is an engine or vehicle system that the user is required to check either prior to using the vehicle or at intervals during operation of the vehicle. Examples of system components include crankcase dipsticks, transmission lubricant dipsticks, coolant systems, power steering fluid reservoirs and reservoirs of other descriptions, batteries, air filters, tire air pressure gauges, and many more. Each system component has RFID chip-equipped tag—a "FOB"—tethered to the user-interface for that particular system component. For instance, if the system component is a crankcase dipstick, the FOB is permanently tethered to the outer end of the dipstick. The master module includes a FOB land that is adapted for receiving the FOM and the master module reads data from the FOB when the FOB is oriented adjacent the FOB land; the master module is capable of working with and reading plural FOBs for any single vehicle and in an exemplary embodiment is capable of reading up to 16 FOBs, each FOB being associated with a different system component. The master module is electrically interfaced with a control system for the vehicle—as used herein, "control system" refers to a vehicle system that the master module controls. The most typical control system that the master module controls is the starter motor for the vehicle or equipment. The master module may be remotely controlled via wireless telecommunications links to a remotely located computer so that the specific attributes of the master module may be configured and varied remotely by the system managers and the like.

As used herein, the phrase "operation component" is a system that is being controlled by the master module, for instance, either "locked" or "unlocked" by the master module. For example, in the case of an equipment monitoring system 10 being used to insure that engine crankcase oil is being checked on a daily basis prior to startup of the engine, the "operation component" is the vehicle's engine.

In use, the master module is mounted in the vehicle in an appropriate location that is remote from the system components such that the user is forced to move away from the system component in order to place the FOB next to the master module. The FOBs are permanently tethered to the system components that are to be checked. As an example, in the case of the system component being an engine crankcase dipstick, the master module may be located in the cab of the vehicle—the operator is required to remove the dipstick (i.e., the system component) and physically move to the location of the master module (i.e., in the vehicle's cab) in order to have the FOB that is tethered to the dipstick read by the master module.

The owner of the vehicle or equipment programs the master module with desired instructions. Continuing with the example just described, if the master module is programmed such that the engine cannot be started until the FOB connected to the dipstick has been checked, when the operator desires to use the vehicle, the operator must first run the required monitoring checks in order to be able to start the engine.

For the following description of the invention it is assumed that the vehicle is heavy equipment such as a front end loader powered with a diesel engine. Although the invention is not limited to such a vehicle, it presents a good way to illustrate the structure and operation of the vehicle. The owner of the vehicle wants the crankcase oil to be checked every morning before the engine is started, and the transmission fluid level to be checked every other day. The "system components" are thus the crankcase dipstick and the transmission fluid level dipstick. A FOB is thus tethered to the crankcase dipstick and another FOB is tethered to the transmission fluid level dipstick. Each FOB carries unique identifying data that identifies that FOB and thus the system component that it is uniquely associated with. When the operator arrives every morning, the master module, mounted remotely in the cab of the vehicle, has locked the starter motor system for the vehicle and it cannot be started. The operator thus must remove the crankcase dipstick and move it into close proximity to the master module. The RFID reader chip in the master module reads an RFID identifier chip in the FOB and records the time that RFID identifier was read. The master module then unlocks the starter motor interlock and allows the engine to be started. The same thing is done the next day for both of these system components, the crankcase dipstick and the transmission fluid level dipstick.

The master module and the remote computer include appropriate software for controlling the system, as detailed below. It will be appreciated that even though the operator must remove the dipstick, nothing forces the operator to visually check the oil level as reflected by the dipstick. However, forcing actual removal of the system component is a reliable way to encourage the operator to actually check whatever attributes are being monitored. Thus, if the operator has the dipstick in his or her hand, he or she is more likely to actually look at the oil level on the stick.

Turning now to FIG. 1, the equipment monitoring system 10 according to the present invention comprises three primary components: a master module 20, and a FOB 30 that is attached to a system component 40. The equipment monitoring system 10 is electrically connected to the operation component 350 in vehicle 352. The FOB 30 is either permanently or semi-permanently attached to the system component 40 with a tether 42. Each of the primary components just mentioned is detailed below. In addition, the equipment monitoring system 10 is adapted for use with a remote computer 50 that may be connected to the master module 20 via wireless communication protocols such as Bluetooth or with a conventional wired connection.

The master module 20 is a data reader that has a housing 200 mounted to a backing plate 202 that includes plural peripheral bores 204 through which screws (not shown) may be inserted to mount the module 20 in a desired location, typically in a vehicle such as vehicle 352. Control electronics are contained in housing 200 and are connected to the vehicle operational component 350 or other equipment electrical systems—collectively operational components 350—with a wiring harness 206—the wires that comprise the wiring harness 206 extend through a fitting 208 to connect to the control electronics within the housing. A land 22 (also referred to as a slot 22—labeled with the words "PLACE CARD HERE" in FIG. 1) is located on the upper surface 210 of housing 200 and is configured to receive a FOB 30 so that the control electronics in the master module may read data from the FOB. A RFID reader chip 232 is housed in housing 200 under or adjacent to land 22 to read data from a FOB 30 placed in the land. Plural indicator lights 212 are also located on the upper surface 210 and each is associated with a different system component 40. In the example of FIG. 1, there are 8 separate indicator lights 212-212a through 212h. Indicator light 212a is associated with and indicates the status of the vehicle's battery, hence the letters "BATT" printed adjacent the light. Indicator light 212b is associated with indicates the status of the vehicle's engine, hence "ENG." The other indicator lights in FIG. 1 are associated with "AIR" (212c), "OIL" (212d) and "TRAN" (212e), and in FIG. 1, 3 indicator lights are unused (but could be utilized with other system components as desired. The indicator lights 212 are LEDs that are indicated a "go" or "no-go" condition—"go" being green, and "no-go" being red.

Master module 20 is mounted in an appropriate location on a vehicle or other equipment such that the master module is physically separated from all system components 40 in that particular vehicle that are being monitored and thus which are equipped with FOBs 30. The mounting location for module 20 must be separated by a sufficient distance from any given system component 40 that the FOB 30 associated with that system component cannot be read by the master module without the operator physically carrying the FOB from its normal location to the master module. For example, in FIG. 1 the master module 20 is set up for monitoring five separate system components 40, namely, battery, engine, air, oil and transmission. Since each of these system components is normally located in or near the vehicle's engine, the master module may be mounted in the vehicle's cab. The operator must obtain the system component 40 and the associated FOB 30 from the normal location for such components—that is, the vehicle's engine compartment, then physically carry the FOB, which is tethered and thereby connected to the system component to the master module 20 in the vehicle's cab. Of course, other normal locational combinations are possible so long as the physical separation between system component and FOB is maintained. The actual physical separation between the normal location of FOB 30 and master module 20 may vary, but in all instances must be sufficient that the FOB cannot be read by the master module unless the FOB is physically moved from its normal location to or toward the master module.

Returning again to the familiar example, if the equipment is a piece of heavy machinery and the system components that are being monitored are (a) the crankcase dipstick (i.e., "OIL" (212d)) and (b) the transmission fluid dipstick (i.e., "TRAN" (212e)), the master module 20 may be located in the cab.

Figure 4:
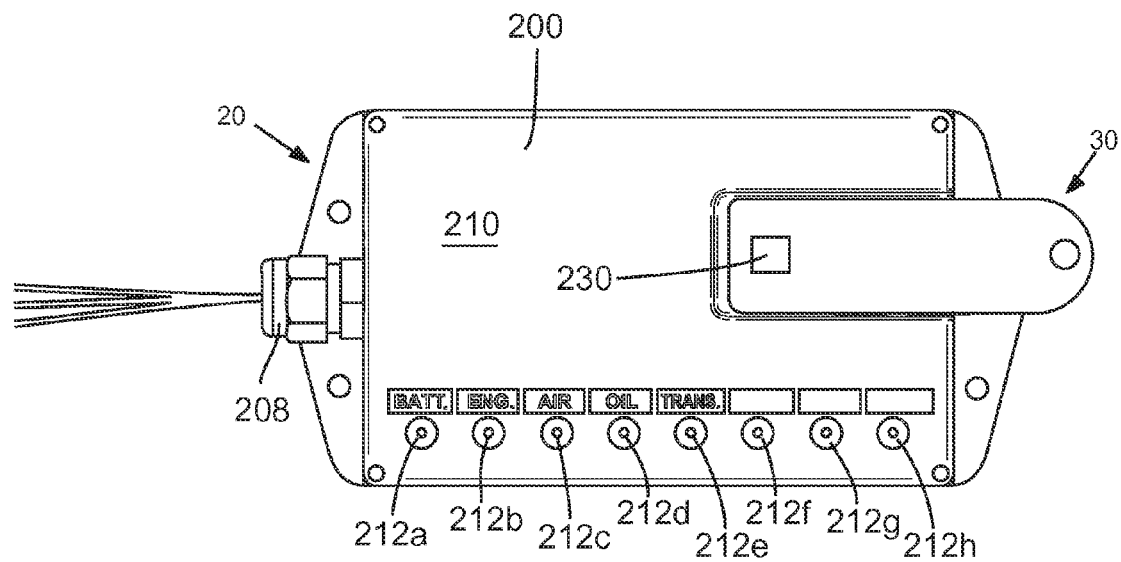
FIG. 4 is a top plan view of the master module shown in FIG. 1 and also showing a FOB oriented adjacent a land on the master module configured for receiving the FOB.
Figure 5:
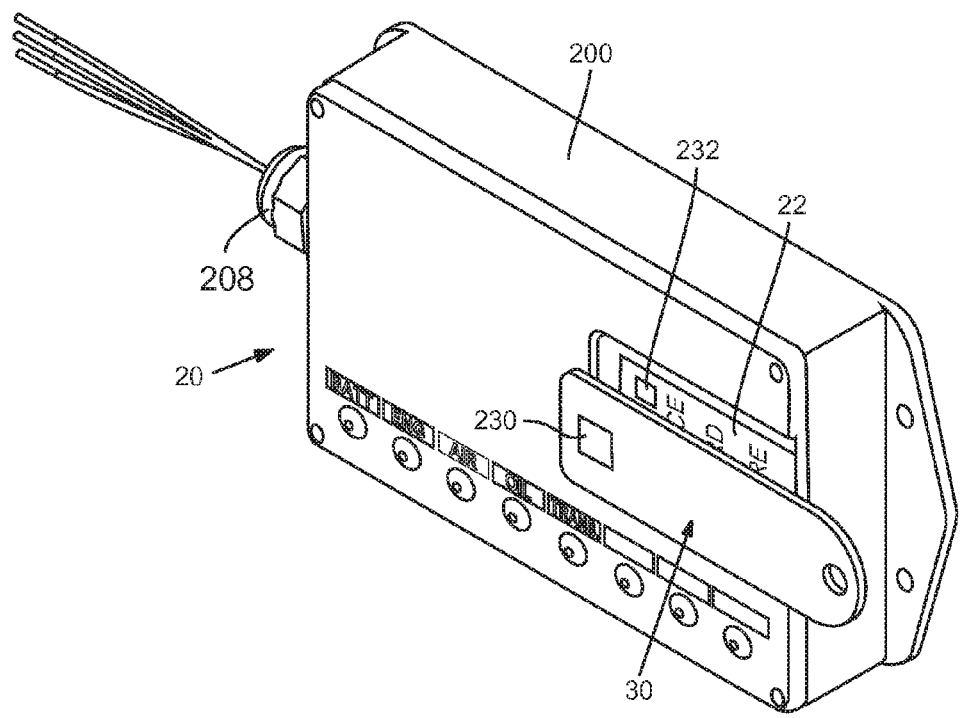
FIG. 5 is a perspective view of the master module and FOM shown in FIG. 4.

FOB 30 is preferably complementary in shape to land 22 so that the FOB is able to be received on land 22, as best seen in FIGS. 4 and 5. FOB 30 includes an RFID chip 230 and the chip 230 comprises a near field communication chip or identifier that uniquely identifies that specific FOB and which system component 40 the FOB 30 is associated with, in addition to vehicle identification data.

A remotely located computer 50 communicates with the master module 20 so that the master module's operating characteristics may be set and controlled remotely by the computer, and so that data read by the master module may be transmitted to the computer. Master module 20 incorporates wireless communications protocols and may further include standard memory devices such conventional memory onto which operating data may be recorded. As indicated below, the master module may also be connected to a data module into which data may be downloaded through RFID chips, for example, when there is no wireless communications link to computer 50. An alarm 60 (FIG. 8) may be mounted to the equipment to provide the operator with a signal indicating an error or alert the operator of some other out-of-bounds condition. The alarm 60 may be an audible alarm such as a horn, a visual alarm such as a light, or both. Similarly, a like alarm 70 is located near the computer 50 to give the managers in the job shack an alert of a problem.

The operating characteristics of the master module 20 are programmed into the module either prior to installation of the module in the vehicle (for instance, through a standard hard-wired communications connection to computer 50) or via wireless communications with the computer 50 after the module 20 has been installed in the vehicle. Operating characteristics for any given master module 20 will depend on the type of vehicle or equipment, its operating conditions, and many other factors. But as noted, a few system components that owner may want checked include crankcase dipsticks, transmission lubricant dipsticks, coolant systems, power steering fluid reservoirs and reservoirs of other descriptions, batteries, tire air pressure gauges, hydraulic fluid levels and the like.

As noted, each system component 40 that is being monitored has a FOB 30 attached to it with a tether 42 or other attachment, and that FOB has an RFID chip 230 or identifier that uniquely identifies that specific FOB and which system component 40 it is associated with. And as previously indicated, some system components may require daily checking and others may be checked with some other frequency interval. These operating characteristics are programmed into the computer 50 and master module 20.

Figure 8:
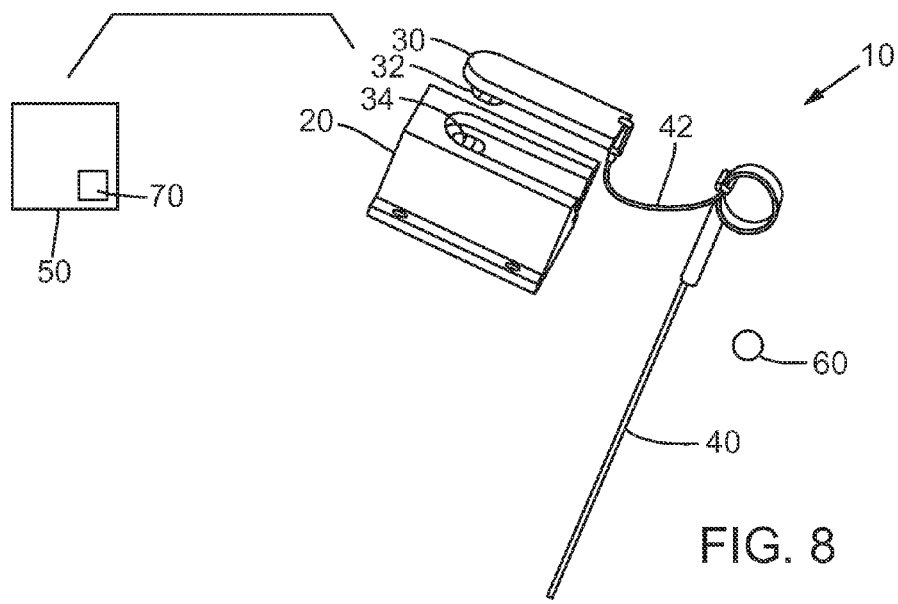
FIG. 8 is a perspective and partially schematic view of a second illustrated embodiment of a master module of an equipment monitoring system according to the present invention, showing the FOB attached to a system component device (in this case, a crankcase dipstick) and a remote computer system.
Figure 11:
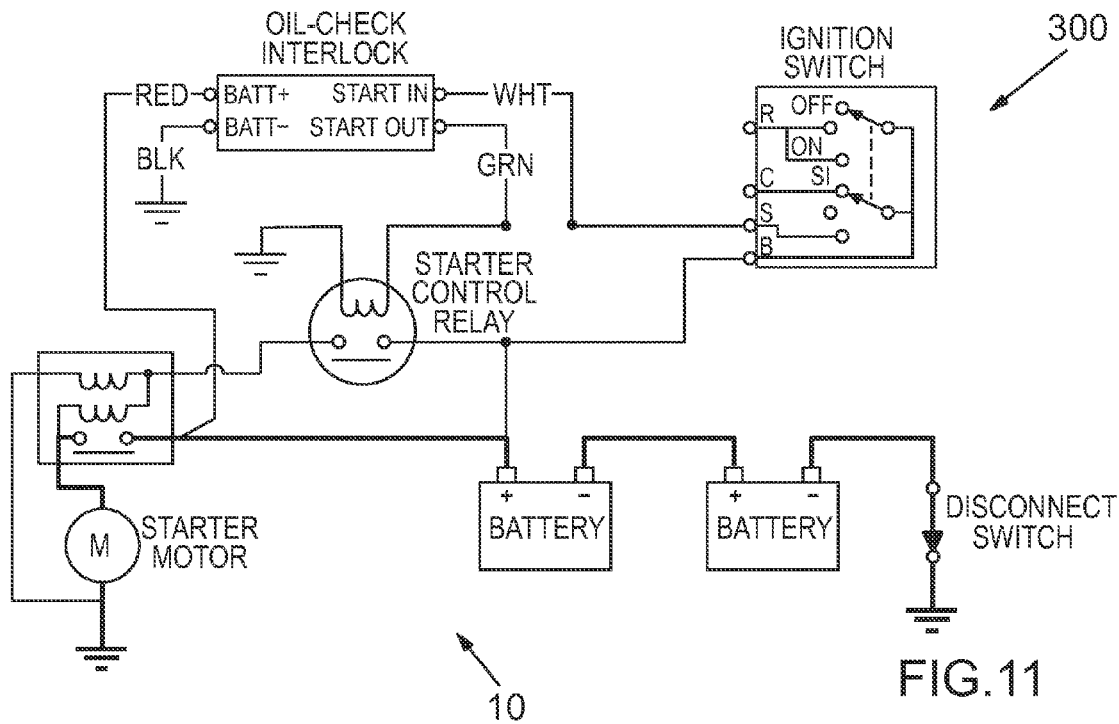
FIG. 11 is an electrical schematic diagram showing possible electrical circuitry for the equipment monitoring system according to the present invention.

The equipment monitoring system 10 illustrated in FIG. 8 shows a system component 40 in the form of an actual crankcase dipstick, which is attached with tether 42 to FOB 30. In the case of the embodiment of FIG. 8, the FOB 30 includes a magnet 32 that causes a reed switch 34 in the master module to energize the module to a power-on condition (power to the master module may be supplied by an on-board battery or other remote power supply). Once the master module 20 is powered on and the FOB 30 is within close proximity to the module, the RFID reader 232 in the master module 20 reads the RFID identifier chip 230 in the FOB 30 and records the data including the identity of the system component and the time of reading. If appropriate and if all pre-programmed conditions are met, then the master module 20 allows engine startup to occur. On the other hand, if pre-programmed conditions are not met, the master module 200 locks out the vehicle's operating system to prevent normal operation. As an example, and with reference to FIG. 11, which is an exemplary and schematic diagram showing possible electrical circuitry for the equipment monitoring system 10 according to the present invention, the master module interrupts to engine starter motor to prevent engine startup. More specifically, the interlock provided by master module 10 prevents startup by interrupting the power to the starter control relay and not the power to the starter motor solenoid. There are equivalent manners of providing an interlock feature to prevent normal operation of the vehicle's operating system such as the engine.

With continuing reference to FIG. 8, when an operator desires to begin using the equipment the system component 40 is physically removed from its usual position on the vehicle and the FOB 30 is brought into close proximity to the master module 20. For example, if the system component is a crankcase dipstick such as that shown, the dipstick (i.e., system component 40) and FOB 30 are removed and brought into close proximity to the master module 2—. The FOB 30 is preferably cooperatively shaped to fit into a cooperatively shaped the land or slot 22 in the master module 20. Again, if all pre-programmed conditions are met, the operator may start the vehicle's engine.

Figure 9:
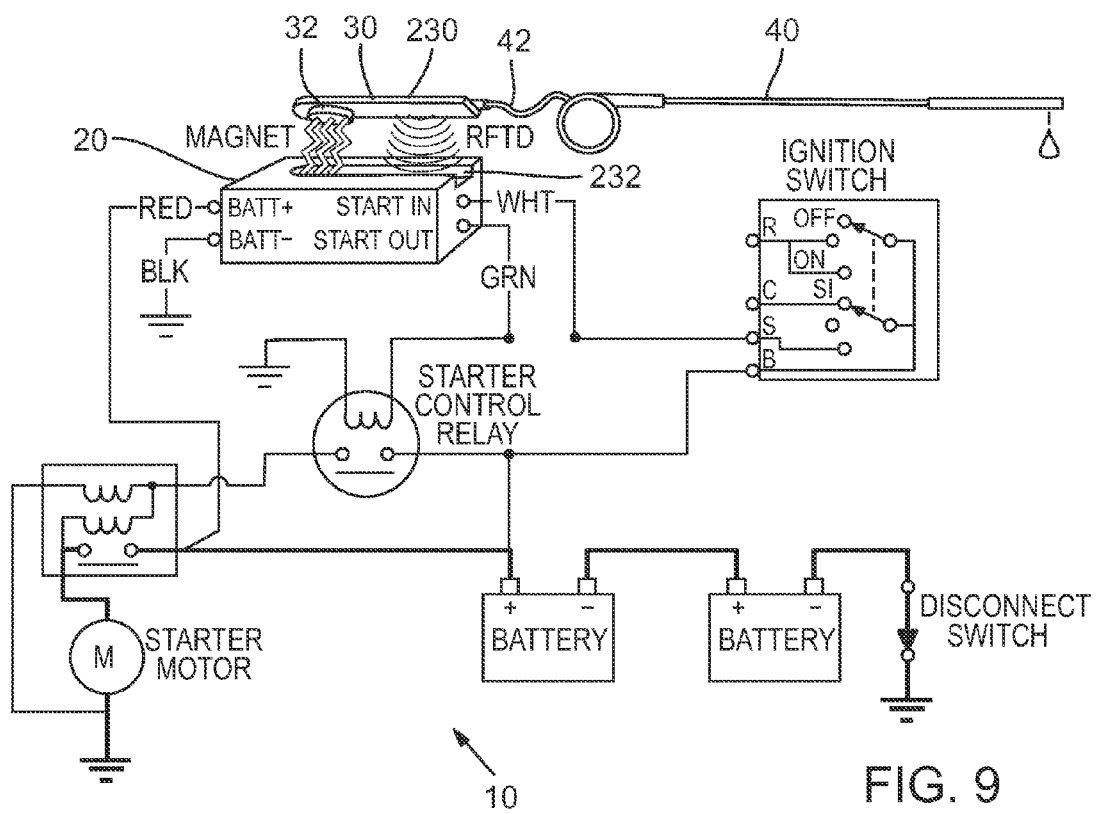
FIG. 9 is a schematic view of the equipment monitoring system shown in FIG. 8, illustrating exemplary control electronics and circuitry.

FIG. 9 is a schematic illustration of the proximity of FOB 30 associated with a system component 40 (a dipstick) to master module 20. It will be appreciated that use of magnet 32 is optional.

Figure 6:
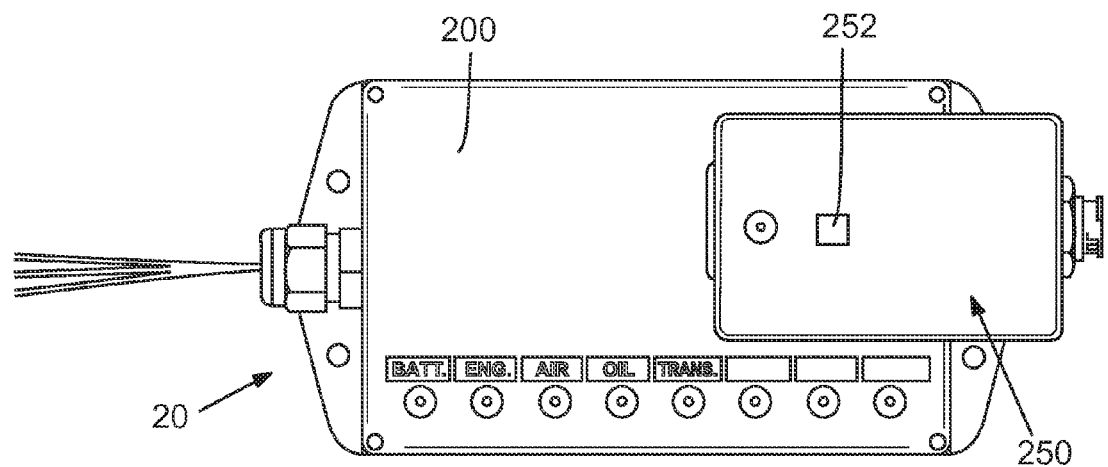
FIG. 6 is a top plan view of the master module shown in FIG. 1 and also illustrating a data module oriented adjacent the land on the master module, the data module configured for downloading data from the master module.
Figure 7:
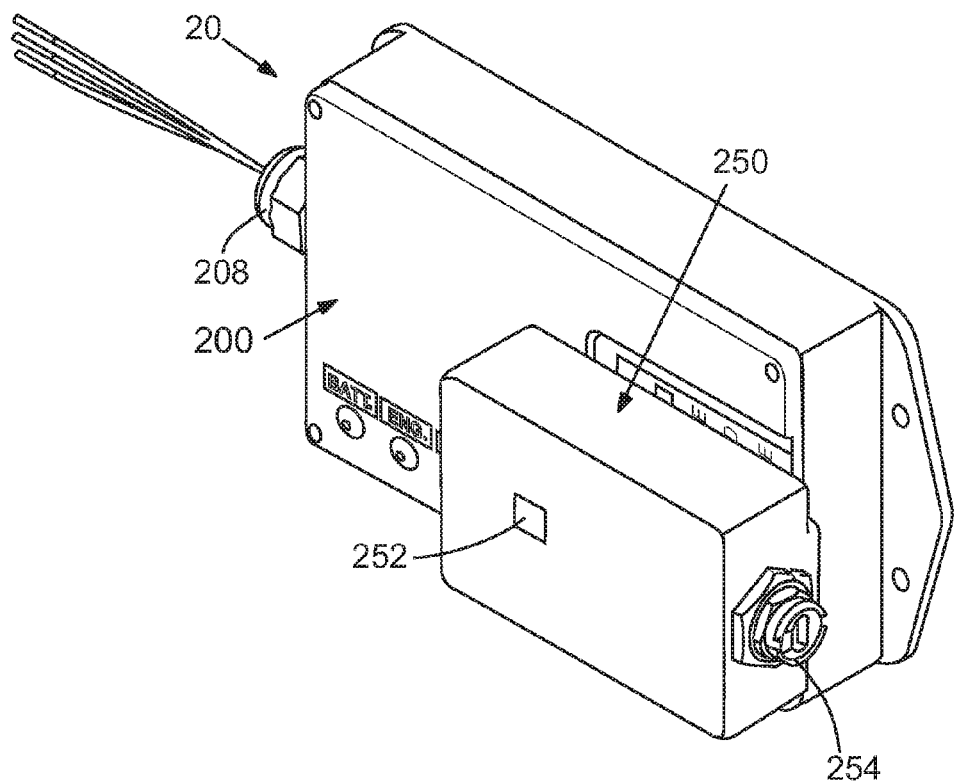
FIG. 7 is a perspective view of the master module and data module shown in FIG. 6.

With returning reference to FIGS. 6 and 7, an optional data module 250 is illustrated positioned next to land 22 on the master module 20. The data module 250 includes an RFID chip 252 that is readable by RFID reader chip 232 in master module 20 (not visible in FIGS. 6 and 7). As such, data module 250 is configured for downloading data from the master module 20. The data module is utilized where no other communication link may be established between the master module 20 and the remote computer 50, for example, where wireless communications are unavailable. The data module 250 includes standard communications ports such as a USB port 254 so that data downloaded from master module 20 to data module 250 may be transferred onto a memory stick or directly to another machine, such as computer 50.

The invention thus defines a system for controlling or limiting vehicle and equipment operation and maintenance by employing a device that insures that the vehicle may be operated only after performing required monitoring duties interlocked into the vehicle or equipment.

Equipment monitoring system 10 may also incorporate systems and equipment that allows for only authorized operators to be able to use a given piece of equipment. Thus, with reference to FIG. 10, a unique operator FOB 140 may be assigned to each operator and the operator FOB 140 includes operator identifying information. A master box 150 is attached to each vehicle (the master box 150 could be incorporated into the master module 20) and includes a database comprising a list with information on approved operators for that vehicle. The operator swipes their operator FOB 140 at the master box 150 and if the FOB 140 is associated with an approved operator for that particular vehicle, the master module 20 is activated and the required monitoring checks with system components 40 may be initiated. On the other hand, if the operator identifying information does not match the list of approved operators for that vehicle, the operating component will remain disabled.

Figure 10:
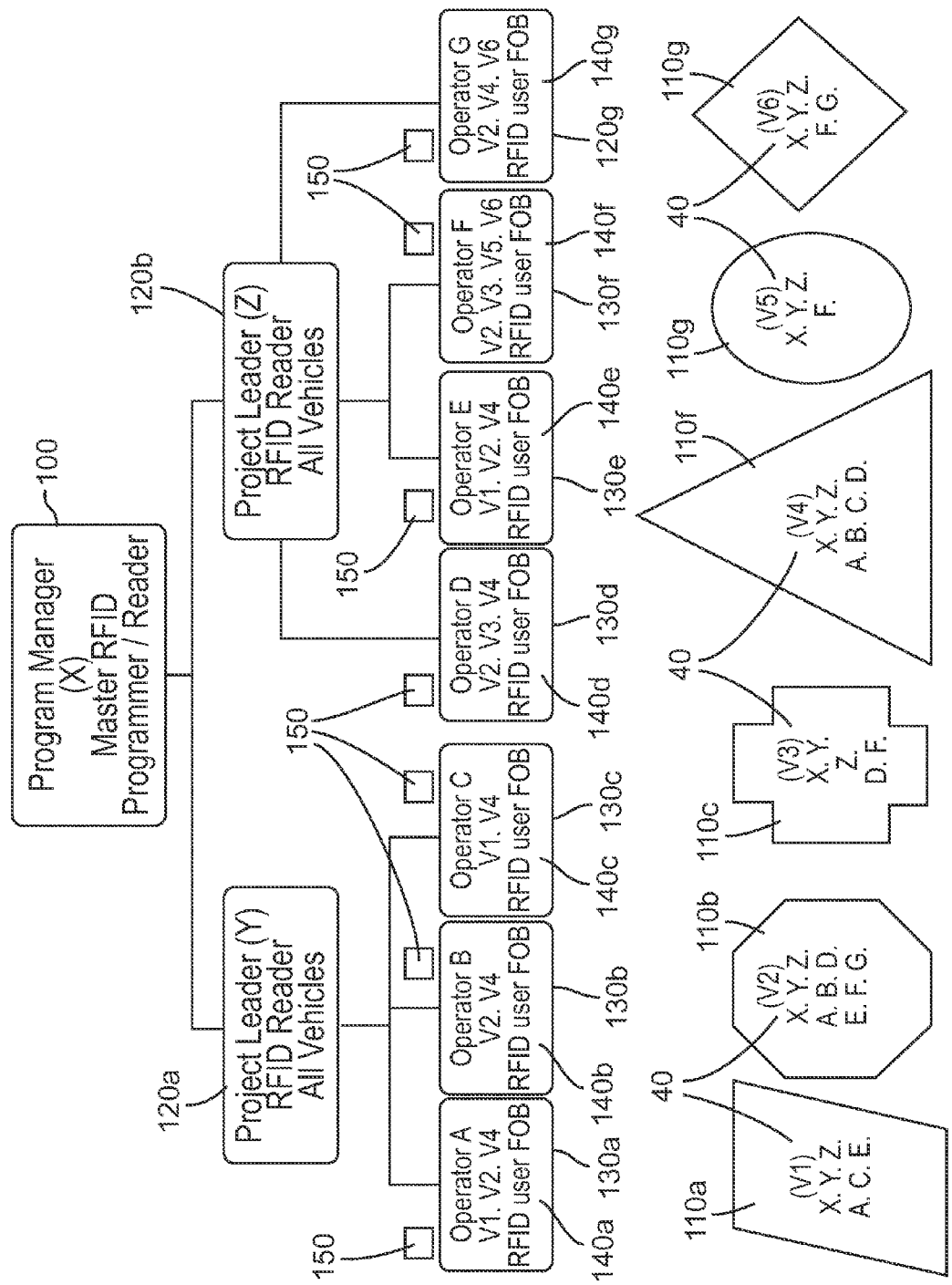
FIG. 10 is an operational flow chart showing basic systems operations for the equipment monitoring system according to the present invention.

FIG. 10 is an operational flow chart for one embodiment of equipment monitoring system 10. A program manager 100 has access to and control of all system components 40 for vehicles 110a through 110f. Since each vehicle 110 is different from the others, system components 40 for individual vehicles 110 vary from vehicle to vehicle. For example, vehicle 110a in FIG. 10 requires checks of six separate system components 40, identified with the letters X, Y, Z, A, C and E. In contrast, vehicle 110e requires that checks be run on only four system components 40: identified as X, Y, Z, and F.

Project leaders 120a and 120b are assigned reader capability on any or all vehicles 110 according to the assignments defined by program manager 100. Individual equipment operators 130a through 130g are assigned a unique operator identifier FOB 140a through 140g. The operators swipe their operator identifier FOB 140 at the vehicle master box 150. If the master box 150 recognizes the operator as an approved operator of that specific vehicle, the RFID reader in the master module 20 is activated and system components 40 may be checked for that vehicle. Preferably an audible tone or light, or both, will be activated when each system component 40 has been properly checked at master module 20. When all required system components 40 for that particular vehicle have been checked, an alarm tone or beacon may be deactivated and the ignition interlock will be inactivated so the engine may be started. External alarms may also be included so that incomplete vehicle inspection may be noted by remote persons, such as project leaders 120 who may be in a job shack.

It will be readily appreciated that the equipment monitoring system 10 described herein will be capable of innumerable operating characteristics. A few of these functional attributes include:

a. the master module attached to the vehicle will identify an operator and multiple check points via an RFID identifier;

b. the master module will allow for a user selectable starter disconnect option if user selected check points have not been identified;

c. the master module will allow for a user selectable starter disconnect bypass, prompting an audible signal and/or a visual beacon if user selected check points have not been identified;

d. the master module may include up to 16 user selectable switches to determine check points and/or users;

e. the system will include multiple RFID tag chips to identify individual users and vehicle check points;

f. the master module will attach to the vehicle in a semi-permanent manner;

g. the master module will indicate to the user all check points to be performed and check points missed;

h. the master module will identify a RFID tag chip in a FOB from a predetermined distance of less than a few inches;

i. the master module will allow for uninterrupted vehicle start up a predetermined number of hours, nominally 16, hours after a user tag has been swiped;

j. as a safety feature, the master module will allow for uninterruptible start up after the preset time limit if vehicle is shut off in less than 30 min increments;

k. the master module will record time stamp data for every vehicle check point;

l. time stamp data may be retrieved via a master reader, like a USB flash drive m. time stamp data may be viewed on any standard computer;

n. the master module will contain a holdup power source to preserve data while power is off;

o. all RFID tags will activate a master module;

p. RFID tags may be color coded;

q. System will operate in a wide range of temperatures.

Figure 12:
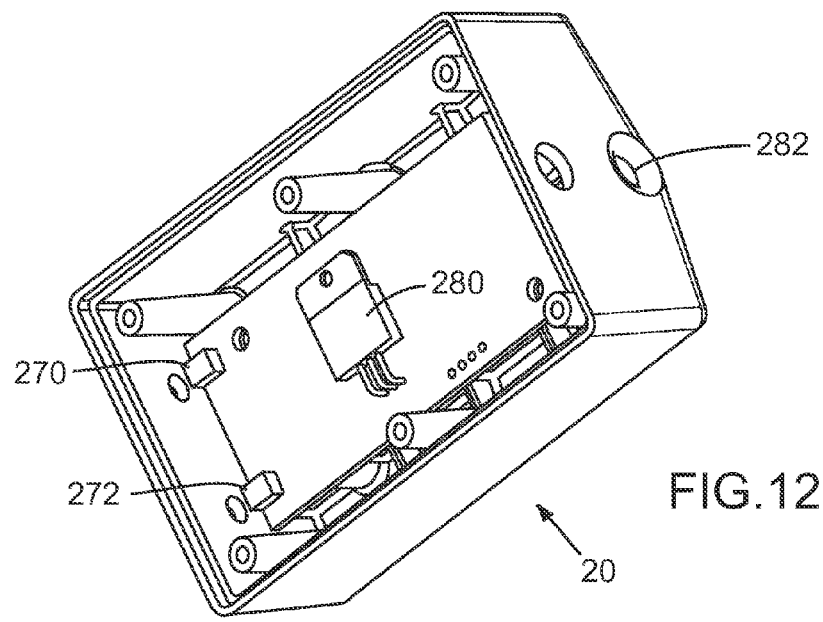
FIG. 12 is a perspective view of an exemplary housing for an alternative embodiment of an equipment monitoring system, the housing mounted to a mounting bracket, which is designed to be mounted near but removed from the system component.

An alternative embodiment of a specific engine interlock apparatus 300 is illustrated in FIG. 12. In this case, interlock from master module 20 that prevents operation of a system component unless all conditions are met relates only to a crankcase dipstick or other specific system component that is being monitored. The apparatus according to this embodiment may be used with essentially any engine that is lubricated with oil and which has a crankcase that defines a reservoir for the oil, and which includes a dipstick for measuring the level of oil in the crankcase. This embodiment of the invention is used primarily with engines in heavy equipment, but may also be used in lighter-duty engines. The interlock is defined by a housing that has an entry port or sensing tube 282 that is configured and shaped to accept the terminal end of the engine's dipstick. Control electronics 280 associated with the sensing tube 282 are actuated by insertion of the dipstick and the sensing tube and include electronics that prevent the engine from starting unless the dipstick has been inserted. If the dipstick is not inserted into the sensing tube 282 and the control electronics 280 are not activated, the interlock 300 disables the engine's starter system so that the engine cannot start.

Thus, with this embodiment, since the operator must remove the dipstick and insert the end of the dipstick into the entry port of the interlock in order to start the engine, the operator is at a minimum encouraged to look at the dipstick to check engine oil level every time the engine is started. The apparatus according to this embodiment of the invention thus provides a method according to which the operator may easily check the engine oil level because the operator is required to handle the dipstick and insert it into the interlock's sensing tube periodically. By forcing the operator to remove the dipstick and push it into the interlock, the operator will almost assuredly check the engine oil level during the process.

The invention may include a second "safety check" apparatus designed to help insure that operators check engine oil level prior to start up; namely, an audible alarm that may be coupled with an interlock apparatus on the dipstick housing or tube that activates if engine start up is attempted without first withdrawing the dipstick.

In the alternate embodiment as shown in FIG. 12, the master module 20 may have two additional LEDs 270 (RED), 272 (YELLOW), that indicate a range of conditions.

| Condition | Red LED (270) | Yellow LED (272) |
|---|---|---|
| Startup | Indicates battery voltage | Rapid flashing |
| Interlock active | 4 blinks every 4 sec | Off* |
| Engine Off | Blink once every 4 sec | Off* |
| Starting | Rapid blinking | Off* |
| Wiring Fault | Slow flashing | Slow flashing |
| Engine Running | Steady on | Off* |

*unless dipstick detected

When power is first applied, the master module 20 measures the battery voltage to determine whether the battery voltage is nominally 12V or 24V. During this measurement, the yellow led 272 flashes rapidly and the red led 270 indicates the battery voltage. A voltage over 15V will light the red led. Once the voltage has been above or below the 15V threshold for a full three seconds, normal operation will begin.

Master module 20 shown in FIG. 12 defines an interlock, shown schematically at reference number 280, which controls operation of the vehicle into which the master module is installed. As noted, the master module 20 includes a dipstick sensing tube 282 into which the distal end of a dipstick may be inserted to activate the interlock. Power loss to the master module 20 resets an interlock timer. Therefore, the interlock 300 will always start out activated. This means whenever the battery is disconnected and reconnected, the dipstick will need to be inserted into the interlock 300 to allow the vehicle to start.

Initially at power up, the interlock 300 is active. When active, the starter is disabled and the red LED puts out 4 rapid blinks once every four seconds. To reset the interlock, the dipstick must be inserted into the sensing tube 282.

If the engine is off and the interlock is not active, then the interlock 300 will blink the red LED once every 4 seconds.

When the operator turns the ignition switch to the start position and the interlock 300 is not active, power will flow through the interlock to the starter control relay and the interlock's red led will flash continuously at about 4 times per second. If power does not flow through the interlock normally, the interlock will enter the wiring fault state to indicate a wiring problem.

If during starting the interlock 300 detects a wiring fault, the interlock will flash both LEDs once a second. This can happen if there is an open connection or short to chassis on the line from the interlock to the starter control relay. If a fault is detected, the interlock will disable the starter and blink both LEDs until either the ignition switch is turned off and back on or the dipstick is detected. The fault switch can also be caused by overheating of the interlock which might occur if the engine is cranked for an excessively long period.

The interlock 300 monitors the battery voltage to determine whether the engine is running. When running, the red LED will be on steady. The threshold voltage for determining the engine is running is 13.6V for a 12V system or 27.2V for 24V system. Note that the interlock will indicate the engine is running when an external charger is connected to the vehicle battery.

As a safety feature, the interlock remains passive for a period after turning off the engine (as noted in FIG. 13). This allows the vehicle to be restarted in case of a stall regardless of whether the oil check timer has expired.

The interlock 300 preferably contains an inductive sensor that detects when the dipstick is inserted into the sensing tube 282. In the states where the yellow LED is normally off, the LED will light when the dipstick is detected.

An optional additional feature is a sensor installed in the engine's dipstick tube and an associated second sensor attached to the dipstick; both sensors are wired to the control electronics. When the operator removes the dipstick from the dipstick tube a signal is sent to the control electronics that registers that the dipstick has been removed. A second signal is sent to the control electronics when the dipstick is reinserted. If the operator is following the proper protocol, the dipstick will be inserted into the sensing tube of the interlock after the dipstick has been removed from the dipstick tube, and before the dipstick is reinserted into the dipstick tube. Thus, sequentially:

a. dipstick removed from dipstick tube, signal sent to controller;
b. dipstick inserted in interlock and sensed by controller;
c. dipstick re-inserted in dipstick tube.

The electronics may be configured to prevent start-up of the engine if any other sequential order is followed. This process is intended to prevent an operator from bypassing actual removal of the dipstick by inserting an object other than the engine's dipstick into the sensing tube of the interlock.

As the dipstick is pushed through the entry port into the housing of the lockout module, the end of the dipstick manually pushes the switch and moves it from the open to the closed position—when the switch is in the closed position the engine is able to start with the normal ignition sequence. A guide tube helps guide the end of the dipstick into contact with the switch.

There are many different sizes and types of dipsticks used with different engines. Another feature that may be utilized in the present invention is to configure the opening into the sensing tube of the interlock in the same geometric configuration as the configuration of the dipstick for the engine in which the interlock is being mounted. In other words, the interlock in any given engine will have an entry port for the sensing tube that will accept only a dipstick having the specific geometric configuration for the specific type of engine. This is yet another feature that is intended to prevent an operator from bypassing the step of actually checking the engine oil level by removing and inspecting the dipstick.

An audible alarm and/or additional ignition lockout may be used to warn operators that oil levels have not been checked and protect the engine. For example, the sensors on the dipstick and dipstick tube may be used to lock out the ignition system unless and until the dipstick has been withdrawn from the tube. Alternately, if the operator attempts start up without having withdrawn the dipstick from the tube, an audible alarm (separate alarm or the vehicle's horn) may be sounded until the dipstick is removed and reinserted. The alarm may be set so that it will not silence until the dipstick has been inserted into the interlock. Timing electronics may be utilized to allow the alarm to silence temporarily after the dipstick has been removed to give the operator time to insert the dipstick into the interlock without the nuisance of an alarm blaring. However, if a preset time has expired before the dipstick is inserted into the interlock, the alarm will again sound.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. A method of maintaining equipment, said method comprising:
   a) locating at a first location on said equipment a FOB reader, said FOB reader adapted to interface with an operational component of said equipment such that said operational component is controlled by said FOB reader;
   b) attaching to a single system component of said equipment a FOB that includes identifying data that uniquely identifies said single system component, said single system component and said FOB located during normal operation of said operational component of said equipment at a second location that is physically separated from said first location by a distance that said FOB reader is unable to read said identifying data when said FOB is at said second location, and wherein said single system component is checked by an operator to evaluate an operating condition of said operational component of said equipment;
   c) moving said FOB and the attached single system component from said second location to said first location by said operator into proximity to said FOB reader to cause said FOB reader to read said identifying data; and
   d) controlling said operational component of said equipment with said FOB reader in response to said FOB reader reading said identifying data.

2. The method according to claim 1 wherein said operational component is an engine and said method further allowing operation of said engine.

3. The method according to claim 2 wherein said engine is normally locked and inoperable until said FOB reader reads said identifying data.

4. The method according to claim 3 in which said single system component is a dip stick for a fluid reservoir in said equipment.

5. The method according to claim 1 in which controlling said operational component further comprises unlocking said operational component to allow said operator to operate said equipment.

6. The method according to claim 1 further comprising attaching plural FOBs, each attached to a separate single system component, and each one of said plural FOBs including identifying data that uniquely identifies said single system component to which said single system component is attached.

7. The method according to claim 6 wherein said FOB reader is adapted for separately reading each of said plural FOBs when a FOB of said plural FOBs with said attached separate single system component is moved into proximity to said FOB reader.

8. The method according to claim 1 further including:
   a) prior to controlling said operational component of said equipment with said FOB reader;
   b) assigning an operator FOB to said operator of said equipment, said operator FOB including operator identifying information uniquely identifying said operator;
   c) causing said operator to move their operator FOB into proximity of said FOB reader; and
   c) with said FOB reader, reading said operator identifying information.

9. The method according to claim 8 including storing in said FOB reader a list of approved operators for said equipment and comparing said operator identifying information with said list of approved operators.

10. The method according to claim 9 including disabling said operational component of said equipment when said operator identifying information does not match said list of said approved operators.

11. A method of maintaining equipment, comprising:
    a) mounting a master module device at a first location in said equipment;
    b) with said master module device, locking an operational component of said equipment such that said operational component is inoperable until said operational component is unlocked;
    c) attaching to a first system component of said equipment a first FOB that includes identifying data that identifies said first system component, said first system component located at a second location in said equipment that is physically remote from said first location, and wherein said first system component indicates an operating condition of said operational component of said equipment;
    d) moving said first FOB from said second location to said first location by an operator into proximity of said master module device so that said master module device reads said identifying data from said first FOB; and
    e) unlocking said operational component of said equipment with said master module device in response to said master module device reading said identifying data.

12. The method according to claim 11 including attaching a second FOB to a second system component, said second FOB including identifying data that identifies said second system component, and moving said second FOB into proximity of said master module device so that said master module device reads said identifying data from said first FOB.

13. The method according to claim 11 wherein said first system component is a dip stick for a fluid reservoir in said equipment.

14. The method according to claim 13 wherein said operational component is an engine.

15. The method according to claim 11 further including:
   a) assigning an operator FOB to said operator of said equipment, said operator FOB including operator identifying information uniquely identifying said operator;
   b) prior to step a) of claim 11, causing said operator to move said operator FOB into proximity of the master module device; and
   c) with said master module device, reading said operator identifying information.

16. The method according to claim 15 including storing in said master module device a list of approved operators for said equipment and comparing said operator identifying information with said list of approved operators.

17. The method according to claim 16 including locking said operational component of said equipment when said operator identifying information does not match said list of approved operators.

18. An equipment maintenance apparatus, comprising:
   a FOB attached with an attachment member to a system component of an operational component of equipment, said system component and said attached FOB located at a first location in said equipment and said FOB including system component identifying data that uniquely identifies said system component, and wherein said system component is checked by an operator to evaluate an operating condition of said operational component of said equipment; and
   an equipment master module device which comprises a reader configured for reading said system component identifying data from said FOB is located at a second location in said equipment, said equipment master module device configured to:
      lock and unlock said operational component of said equipment in response to moving said attached FOB from said first location to said second location by said operator into proximity to said reader of the equipment master module device, and
      cause said reader of said equipment master module device to unlock said operational component after matching said identifying data, said second location physically separated from said first location in said equipment.

* * * * *